US012372859B1

(12) United States Patent
Murphy

(10) Patent No.: US 12,372,859 B1
(45) Date of Patent: Jul. 29, 2025

(54) ILLUMINATION APPARATUS AND METHOD OF CONTROLLED BEAM DIVERGENCE FOR AERIAL VEHICLES

(71) Applicant: OPTI-LOGIC CORPORATION, Tullahoma, TN (US)

(72) Inventor: Jonathan Murphy, Tullahoma, TN (US)

(73) Assignee: Opti-Logic Corporation, Tullahoma, TN (US)

( * ) Notice: Subject to any disclaimer, the term of this patent is extended or adjusted under 35 U.S.C. 154(b) by 798 days.

(21) Appl. No.: 17/703,112

(22) Filed: Mar. 24, 2022

Related U.S. Application Data

(60) Provisional application No. 63/173,822, filed on Apr. 12, 2021.

(51) Int. Cl.
| | |
|---|---|
| *B64D 47/02* | (2006.01) |
| *F21V 5/06* | (2006.01) |
| *G03B 21/14* | (2006.01) |
| *G05D 1/00* | (2006.01) |
| *H04W 4/46* | (2018.01) |
| *B64U 101/00* | (2023.01) |

(52) U.S. Cl.
CPC ........... *G03B 21/142* (2013.01); *B64D 47/02* (2013.01); *G03B 21/145* (2013.01); *G05D 1/0094* (2013.01); *G05D 1/104* (2013.01); *H04W 4/46* (2018.02); *B64U 2101/00* (2023.01)

(58) Field of Classification Search
CPC B64D 47/02; B64D 47/04; F21V 5/00; F21V 5/006
See application file for complete search history.

(56) References Cited

U.S. PATENT DOCUMENTS

2022/0120404 A1\* 4/2022 Murugesan ........... F21S 41/141

FOREIGN PATENT DOCUMENTS

CN 107472547 A \* 12/2017 ............. B64D 47/02

\* cited by examiner

*Primary Examiner* — Ryan D Howard
(74) *Attorney, Agent, or Firm* — Patterson Intellectual Property Law, PC

(57) ABSTRACT

An illumination apparatus comprises a housing configured to be coupled to an aerial vehicle. Coupled to the housing are a light source and a lens system at least partially covering the light source and configured to adjust an angular divergence of light therefrom. At least one position sensor is positioned within the housing and generates signals corresponding to an altitude of the illumination apparatus, a distance between the illumination apparatus and a ground surface, and/or a multi-axis angular position of the illumination apparatus relative to the ground surface. A controller within the housing adjusts the angular divergence of the light from the light source using the lens system based at least in part on monitored data from the at least one position sensor and a selected spot size of the light on a target wherein an actual spot size on the target is approximately equal to the selected spot size.

20 Claims, 5 Drawing Sheets

ILLUMINATION APPARATUS AND METHOD OF CONTROLLED BEAM DIVERGENCE FOR AERIAL VEHICLES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 63/173,822, filed Apr. 12, 2021, and which is hereby incorporated by reference.

BACKGROUND

The present invention relates generally to illumination devices. More particularly, this invention pertains to illumination devices coupled to unmanned aerial vehicles (UAVs) or manned aerial vehicles (MAVs).

Light sources are of course well known in the prior art for the purpose of illuminating houses, streets, motorways, cities, and countless other applications. The implementation of light sources for the above-referenced purposes may further have multiple commercial or other practical applications in the aerial vehicle market. The aerial vehicle market as discussed herein may without limitation include for example unmanned aerial vehicles (UAVs) as well as manned aerial vehicles (MAVs). Many UAVs as previously known in the art have indicator lights installed on them, but not large spotlights. In this usage, the term "spotlight" for illustrative purposes is used to denote a large light source that specifically illuminates a target that is below the illuminating source.

Spotlights are common in helicopters and are used for law enforcement applications when pursuing suspects who are in a vehicle or may be "on-foot." Here the term "on-foot" for illustrative purposes may denote a live subject that is not in, on, or using a vehicle of any type for movement. Law enforcement may use spotlights to for example aide in their pursuit of subjects by illuminating the subjects in low light conditions. One demonstrable flaw in the spotlight design is that the area of illumination by the spotlight changes size with altitude. This may affect the ability of law enforcement personnel to maintain a visual connection with the target they are viewing. The term "altitude" as used herein may be meant to denote the distance of the aerial vehicle with respect to sea level, but is also used interchangeably to describe the distance from the aerial vehicle to the surface below the aerial vehicle, as well as other implicated meanings to one of skill in the art. This definition for example accounts for the aerial vehicle being above ground that is higher or lower than sea level as well as the aerial vehicle being above a target that is between the ground and the vehicle.

In law enforcement, accident scenes, search and rescue, and other markets, it is further essential to have proper illumination in dim or otherwise relatively low light conditions.

BRIEF SUMMARY

The present disclosure provides an enhancement to conventional spotlight implementations, at least in part by introducing a novel system, apparatus, and method for adjusting aerial vehicle spotlight spot size with respect to altitude.

Such systems, apparatus, and methods as disclosed herein may utilize sensor data for altitude, at least in part, to control light spot size (e.g., surface area coverage) on the surface of target areas to be adjusted based on altitude. The present disclosure may further describe exemplary use of the measurements of altitude to calculate and implement focal point adjustments of optics for an illuminated light source in order to keep the spot size on a particular target static. One of skill in the art may appreciate that the new and improved apparatus, system, and method may be used to enable multiple service industries, such as the above mentioned, to better serve and protect the people in their areas.

An exemplary such apparatus may desirably feature an attachment mechanism to an aerial vehicle, which in various embodiments may be detachable or substantially permanent in nature. The exemplary such apparatus may feature an environmentally protected enclosure. The exemplary such apparatus may further feature a multi-axis position sensor, electronic memory, wireless communication, altitude/pressure sensor(s), distance sensor(s), a controller, a mechanical motor, optics, and light source(s). The exemplary such apparatus may feature direct connection and/or wireless communication abilities, as well as dedicated electronics to control sensors, power flow, and all necessary aspects of the system. The exemplary such apparatus may be powered from the aerial vehicle, or alternatively may have an internal power supply. The exemplary such apparatus may have the ability to measure altitude of the aerial vehicle to which it is attached. The exemplary such apparatus may further have the ability to adjust the focal length of the optical system of a light source such that the light source spot size on a target may be controlled.

In a particular exemplary embodiment, an illumination apparatus as disclosed herein for attachment to an aerial vehicle comprises a housing configured to be coupled to the aerial vehicle, a light source coupled to the housing, and a lens system coupled to the housing and at least partially covering the light source, the lens system configured to adjust an angular divergence of light from the light source. At least one position sensor is positioned within the housing and configured to generate signals corresponding to an altitude of the illumination apparatus, a distance between the illumination apparatus and a ground surface, and/or a multi-axis angular position of the illumination apparatus relative to the ground surface. A controller is positioned within the housing, functionally linked to each of the at least one position sensor, the light source, and the lens system, and configured to adjust the angular divergence of the light from the light source using the lens system based at least in part on monitored data from the at least one position sensor and a selected spot size of the light on a target such that an actual spot size on the target is approximately equal to the selected spot size.

In one exemplary aspect in accordance with the above-referenced embodiment, a wireless transceiver is positioned within the housing, functionally linked to the controller, and configured to receive position data from at least one proximate aerial vehicle.

In another exemplary aspect in accordance with the above-referenced embodiment, the controller may be further configured to determine a condition wherein the position data from one or more of the at least one proximate aerial vehicle should be used in place of the signals from the at least one position sensor, and upon determining said condition, to adjust the angular divergence of the light from the light source using the lens system based at least in part on the received position data.

In another exemplary aspect in accordance with the above-referenced embodiment, the at least one position sensor includes one or more of an altitude sensor, a distance sensor, or a multi-axis sensor.

In other exemplary aspects in accordance with the above-referenced embodiment, the altitude sensor may be a pressure sensor, the distance sensor may be a laser rangefinder, and the multi-axis sensor may be a three-axis accelerometer or a gyroscope.

In another exemplary aspect in accordance with the above-referenced embodiment, the lens system may comprise at least one optical lens at least partially covering the light source, and a distance between the at least one optical lens and the light source at least in part controls the angular divergence of the light from the light source.

In another exemplary aspect in accordance with the above-referenced embodiment, the lens system may further include an optical lens housing, and the at least one optical lens is slidably positioned within the optical lens housing.

In another exemplary aspect in accordance with the above-referenced embodiment, the lens system further includes a mechanical drive motor positioned within the housing. The mechanical drive motor may be further configured to control the distance between the at least one optical lens and the light source based at least in part on motor control signals from the controller for adjusting the angular divergence of the light from the light source.

In another exemplary aspect in accordance with the above-referenced embodiment, a mechanical drive motor is coupled between the controller and the lens system, and the controller may be configured to transmit motor control signals to the mechanical drive motor for adjusting the angular divergence of the light from the light source using the lens system.

In another exemplary aspect in accordance with the above-referenced embodiment, the actual spot size projected on the target from the light source may depend at least in part on the altitude of the illumination apparatus, the distance between the illumination apparatus and the ground surface, the multi-axis angular position of the illumination apparatus relative to the ground surface, and/or the angular divergence of the light from the light source.

In another exemplary aspect in accordance with the above-referenced embodiment, a wireless transceiver may be positioned within the housing and coupled to the controller, the wireless transceiver configured to at least receive data from an external device for controlling the selected spot size.

In another embodiment as disclosed herein, a method is provided for controlling an actual spot size projected on a target from an illumination device coupled to an aerial vehicle. A spot size is selected using an external device and the selected spot size is transmitted to the illumination device. A positional data set is generated based at least in part on a sensed altitude of the illumination device, a sensed distance between the illumination device and a ground surface, and/or a sensed multi-axis angular position of the illumination device relative to the ground surface. Light is projected from a light source of the illumination device, and command signals are generated from a controller of the illumination device to an optical system of the illumination device at least in part positioned between the light source and the target based at least in part on the generated positional data set, wherein an angular divergence of the light projected from the illumination device is adjusted using the optical system to maintain the actual spot size approximately equal to the selected spot size based on the generated command signals.

Numerous objects, features and advantages of the embodiments set forth herein will be readily apparent to those skilled in the art upon reading of the following disclosure when taken in conjunction with the accompanying drawings.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
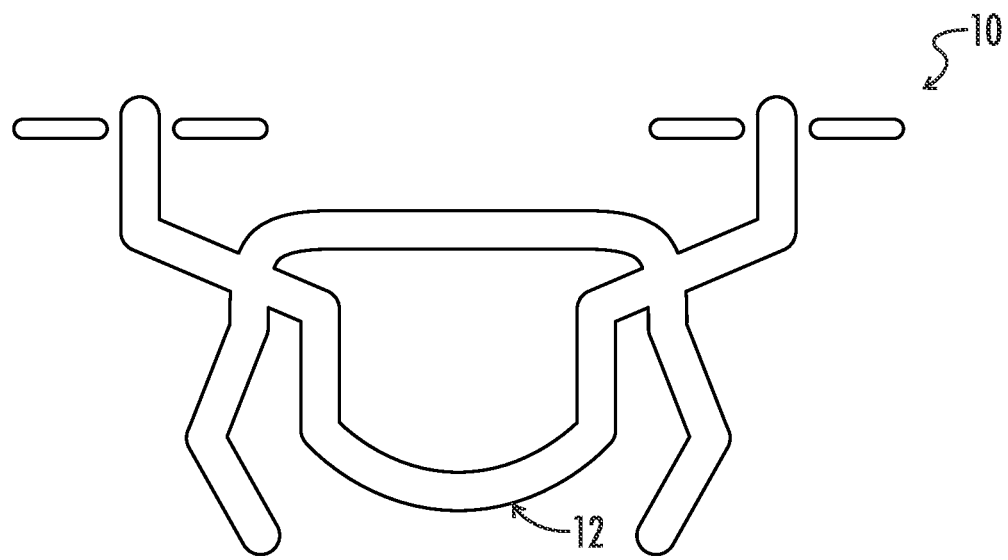
FIG. 1 is a front elevation view of an aerial vehicle.
Figure 2:
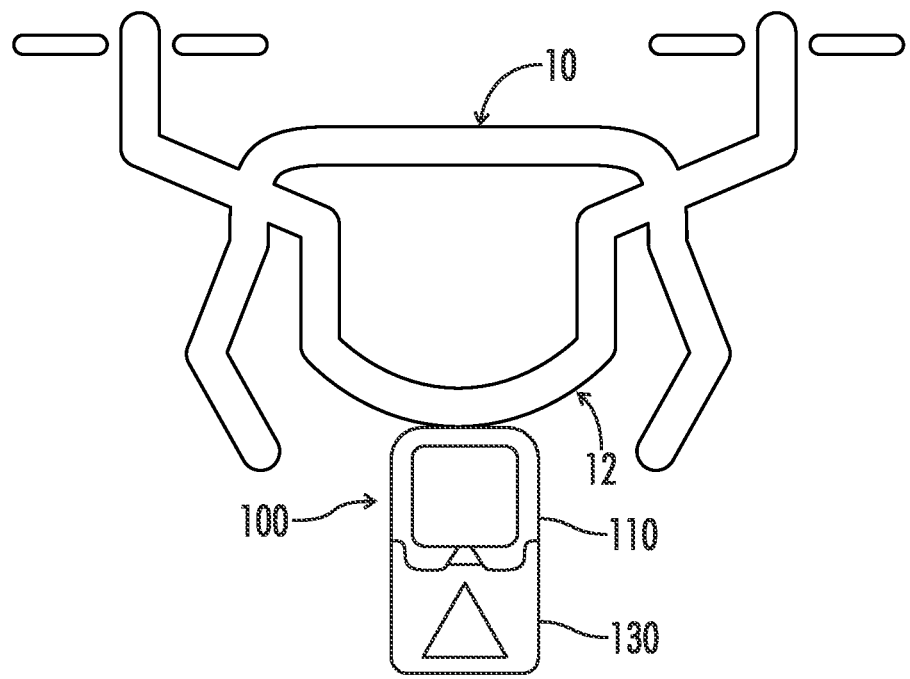
FIG. 2 is a front elevational view of an illumination apparatus coupled to the aerial vehicle of FIG. 1 in accordance with the present disclosure.

Referring to FIG. 1, an aerial vehicle 10 is shown. In certain embodiments, the aerial vehicle 10 may be an unmanned aerial vehicle (UAV), such as a drone or the like. In other embodiments, the aerial vehicle 10 may be a manned aerial vehicle (MAV), such as a helicopter or the like. The aerial vehicle 10 may, more generally, be any variety or type of machine, device, or the like that is intended to fly.

Figure 3:
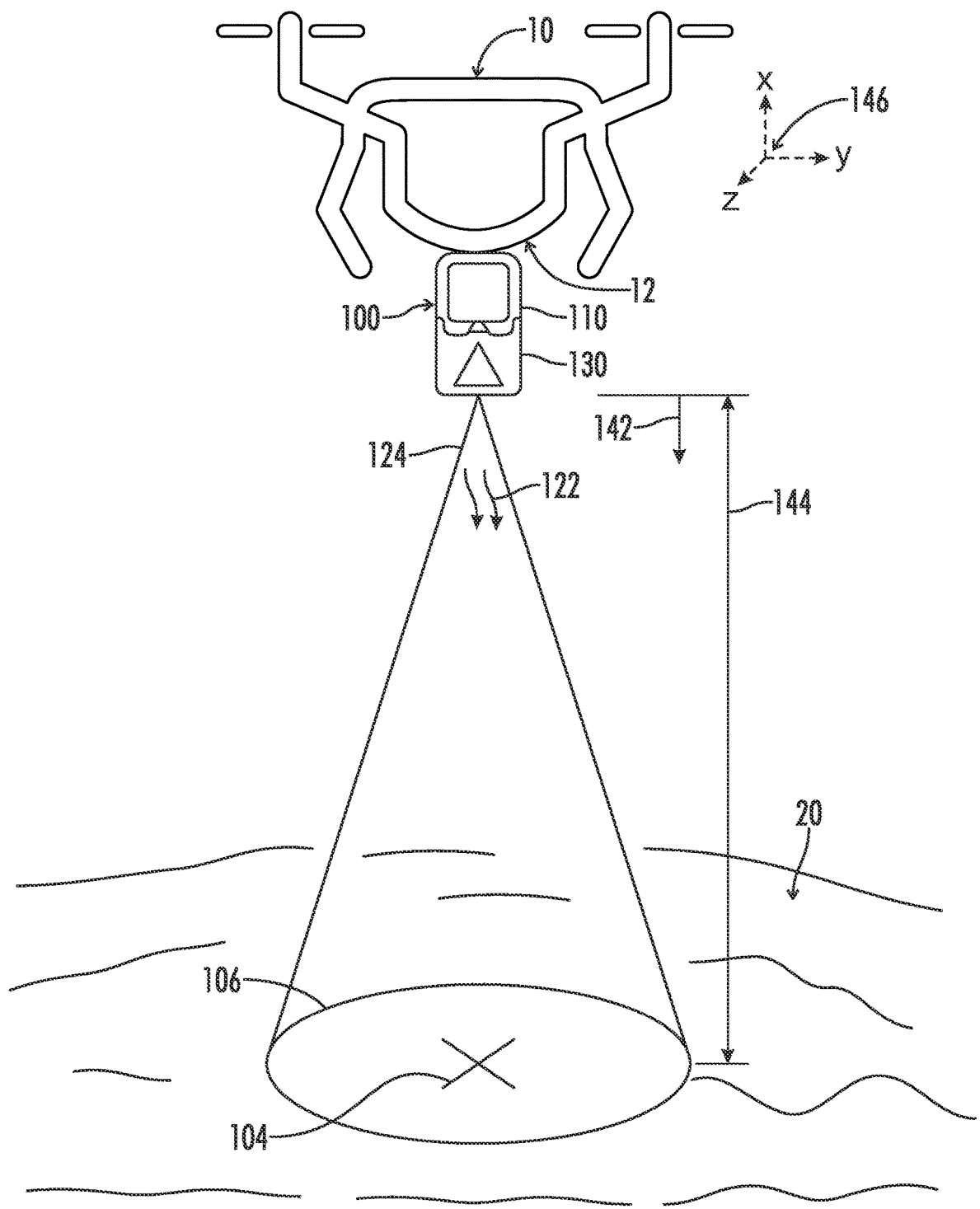
FIG. 3 is a front elevational view of the illumination apparatus of FIG. 2 showing an optical angular path of light emitted from the illumination apparatus in accordance with the present disclosure.
Figure 4:
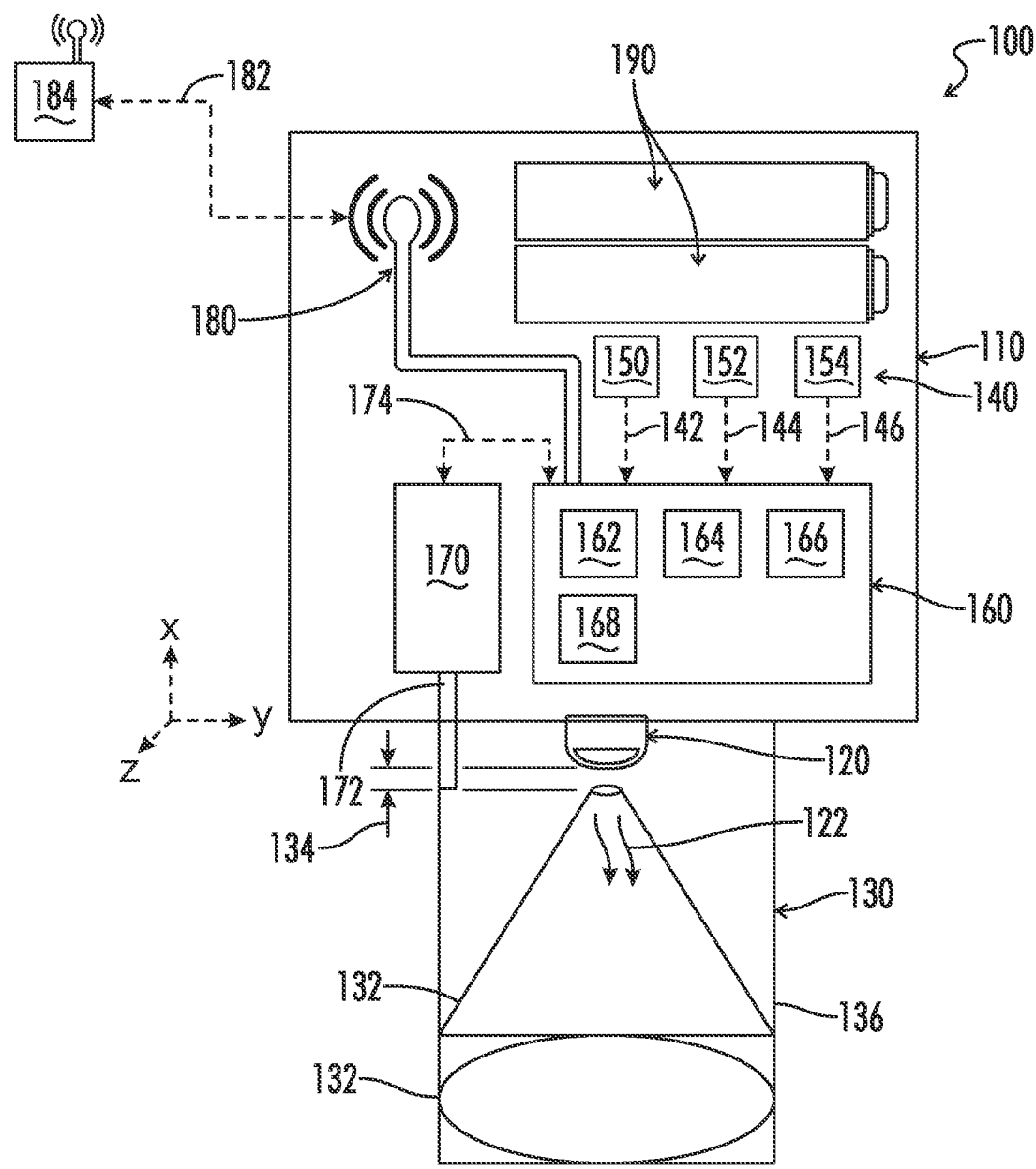
FIG. 4 is a front elevational view of multiple illumination apparatuses of FIG. 3 in accordance with the present disclosure.

Referring to FIGS. 2-5, an illumination apparatus 100 is shown. The illumination apparatus 100 may also be referred to herein as an illumination device 100. The illumination apparatus 100 is configured to be attached to the aerial vehicle 10. The illumination apparatus 100 may be coupled to a lower portion 12 of the aerial vehicle 10 such that the illumination apparatus 100 is positioned between the aerial vehicle 10 and a ground surface 20, shown in FIGS. 3 and 5. As illustrated in FIG. 4, the illumination apparatus 100 may comprise a housing 110, a light source 120, a lens system 130, at least one position sensor 140, and a controller 160.

The housing 110 may be configured to be coupled to the aerial vehicle 10. In certain optional embodiments, the housing 110 may be permanently or removably coupled to the lower portion 12 of the aerial vehicle 10. In further optional embodiments, the housing 110 may be coupled to a standard picatinny rail (not shown) of the aerial vehicle 10. In other optional embodiments (not shown), the housing 110 may be coupled to a front portion, rear portion, or side portion of the aerial vehicle 10. The housing 110 may be waterproof in order to provide environmental protection for the internal components. In certain embodiments (not shown), the housing 110 may feature a mechanical means of attachment such as screws, bolts, or a bracket couplable between the housing 110 and the aerial vehicle 10. In other embodiments (not shown), the housing 110 may be coupled to the aerial vehicle 10 by means of epoxy, glue, or any other weather resistant adhesive. In certain optional embodiments, the housing 110 may be painted, stained, colored, or patterned in such a way that it can be easily camouflaged to match the sky, the aerial vehicle 10, or other typical surrounding environments.

Figure 5:
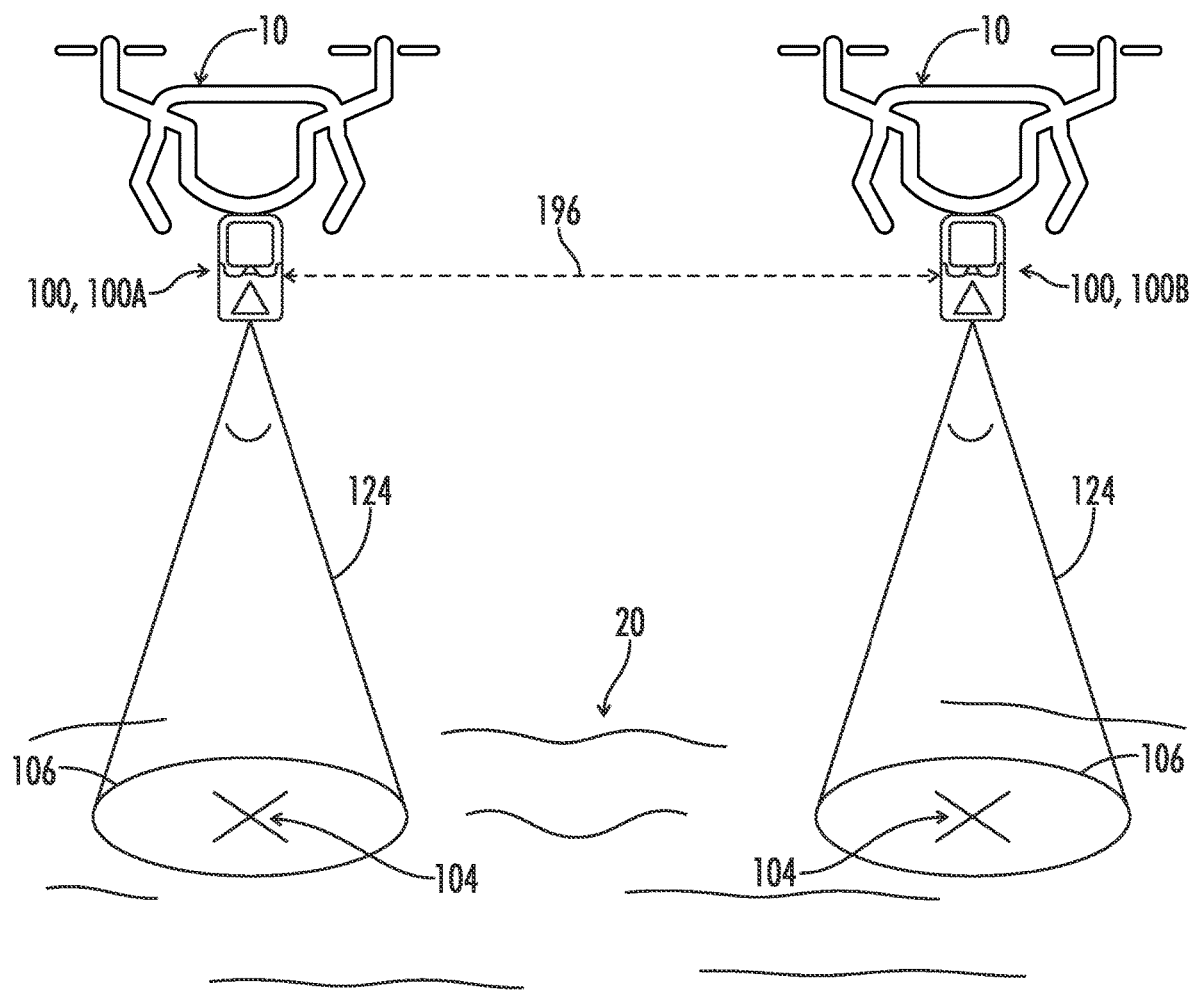
FIG. 5 is a block diagram of the components of the illumination apparatus of FIG. 2 in accordance with the present disclosure.

The light source 120 may be coupled to the housing 110. In certain optional embodiments, the light source 120 may include one or more light emitting diodes (LEDs), for example an array of one or more LEDs, arranged in series and/or in parallel. In other optional embodiments, the light source 120 may be a gas-based light source. The lens system 130 may also be coupled to the housing 110 and positioned on top of or at least partially cover the light source 120, such that light 122 from the light source 120 travels through the lens system 130, shown in FIG. 4. The lens system 130 is configured to adjust an angular divergence 124 of the light 122 from the light source 120. The angular divergence 124 may also be referred to herein as a beam divergence 124 or an optical angular path of light 122 and is illustrated in FIGS. 3 and 5. The angular divergence 124 is the angular measure of the increase in beam diameter relative to a distance from the optical aperture, namely, one or more of the light source 120 or the lens system 130 when present.

The at least one position sensor 140 may be positioned within the housing 110. The at least one position sensor 140 may be configured to monitor at least one of a sensed altitude 142 of the illumination apparatus 100, a sensed distance 144 between the illumination apparatus 100 and the ground surface 20, or a sensed multi-axis angular position 146 (illustrated by the x-y-z coordinate system) of the illumination apparatus 100 relative to the ground surface 20. The controller 160 may use the sensed multi-axis angular position 146 to calculate a vertical angle of the illumination apparatus 100 relative to the ground surface 20. The sensed altitude 142 may be referred to herein as an altitude 142. The sensed distance 144 may be referred to herein as a distance 144. The sensed multi-axis angular position 146 may be referred to herein as a multi-axis angular position 146. The controller 160 may generate a positional data set 148 based at least in part on one or more of the sensed altitude 142, the sensed distance 144, or the sensed multi-axis angular position 146.

The at least one position sensor 140 may include one or more of an altitude sensor 150, a distance sensor 152, or a multi-axis sensor 154, shown in FIG. 4. The altitude sensor 150 may be a barometric pressure sensor or the like. The distance sensor 152 may be a laser rangefinder or the like. The multi-axis sensor 154 may be a three-axis accelerometer, a gyroscope, or the like.

The controller 160 may be positioned within the housing 110. The controller 160 may further be coupled to each of the light source 120, the lens system 130, and the at least one position sensor 140. The controller 160 may be configured to adjust the angular divergence 124 of the light 122 from the light source 120 using the lens system 130 based at least in part on monitored data (e.g., the sensed altitude 142, the sensed distance 144, or the sensed multi-axis angular position 146) from the at least one position sensor 140 and a selected spot size 102 of the light 122 on a target 104 such that an actual spot size 106 on the target is static or consistent (e.g., the actual spot size 106 remains approximately equal to the selected spot size 102 regardless of changes in altitude 142 of the aerial vehicle 10). The selected spot size 102 may also be referred to herein as a selected spot size command 102.

The actual spot size 106 projected on the target 104 from the light source 120 may depend at least in part on one or more of the sensed altitude 142 of the illumination apparatus 100, the sensed distance 144 between the illumination apparatus 100 and the ground surface 20, the sensed multi-axis angular position 146 of the illumination apparatus 100 relative to the ground surface 20, or the angular divergence 124 of the light 122 from the light source 120.

Referring to FIG. 4, the lens system 130 may include at least one optical lens 132 positioned on top of the light source 120. A distance 134 between the at least one optical lens 132 and the light source 120 at least in part controls the angular divergence 124 of the light 122 from the light source 120. Essentially what is happening when the distance 134 is adjusted is that a focal point (not shown) of the at least one optical lens 132 is moved relative to the light source 120. The distance 134 may also be referred to herein as a lens position 134. Each of the at least one optical lens 132 may be any lens, reflector, refractor, or the like.

The lens system 130 may further include an optical lens housing 136. The at least one optical lens 132 may be slidably positioned within the optical lens housing 136. The optical lens housing 136 may be coupled to the housing 110 and further surround the light source 120.

The illumination apparatus 100 may further include a mechanical drive motor 170 positioned within the housing 110. The mechanical drive motor 170 may, for example, be an electric actuator, a linear servo, or the like. The mechanical drive motor 170 may include a linkage 172 coupled between the mechanical drive motor 170 and the at least one optical lens 132. The mechanical drive motor 170 may be configured to control the distance 134 between the at least one optical lens 132 and the light source 120, using the linkage 172 and based at least in part on command signals 174 from the controller 160 for adjusting the angular divergence 124 of the light 122 from the light source 120. The command signals 174 may also be referred to herein as motor control signals 174. A combination between the lens system 130 and the mechanical drive motor 170 may be referred to herein as an optical system 176.

The illumination apparatus 100 may further include a wireless transceiver 180 positioned within the housing 110 and coupled to the controller 160. The wireless transceiver 180 may be configured to at least receive data 182 from an external device 184. The data 182 may, for example, be the selected spot size 102. The wireless transceiver 180 may utilize radio frequency (RF), Bluetooth, Bluetooth Low Energy, WiFi, cellular, pulse light, or the like.

The illumination apparatus 100 may further include a power source 190. The power source 190 may be positioned within the housing 110, such that it is incorporated into the illumination apparatus 100 as a battery power supply and further such that the illumination apparatus 100 may be used as a standalone device. The power source 190 is configured to power at least the light source 120, the at least one position sensor 140 (e.g., each of the altitude sensor 150, the distance sensor 152, and the multi-axis sensor 154), and the controller 160. The power source 190 may also be configured to power the wireless transceiver 180. In certain optional embodiments, the power source 190 may be external to the housing 110, such as from the aerial vehicle 10. In accordance with said embodiment, auxiliary wiring (not shown) may be provided for use with the external power source (not shown).

The controller 160 may control the usage of the power source 190. For example, when the light source 120 is off, the controller 160 may enter a low power mode in order to conserve power. The controller 160, when in the low power mode, may stop monitoring data (e.g., the sensed altitude 142, the sensed distance 144, of the sensed multi-axis angular position 146) from the at least one position sensor 140. When the light source 120 is on, the controller 160 may enter a normal (active on) power mode and thereby continually or periodically monitor data from the at least one position sensor 140.

As mentioned above, the controller 160 may generate command signals 174 for controlling a position (e.g., the distance 134) of the at least one optical lens 132 relative to the light source 120 based at least in part on monitored data (e.g., the sensed altitude 142, the sensed distance 144, or the sensed multi-axis angular position 146) from the at least one position sensor 140 and a selected spot size 102.

Controller 160 includes or may be associated with a processor 162, a computer readable medium 164, a data base 166 and the wireless transceiver 180. The wireless transceiver 180 may utilize Bluetooth or similar communication technologies to communicate with the external device 184, such as a smartphone, for controlling the command signals 174 of the controller 160. Accordingly, the external device 184 may be utilized to enable and disable the light source 120, as well as control the selected spot size 102.

It is understood that the controller 160, described herein, may be a single controller having all of the described functionality, or it may include multiple controllers wherein the described functionality is distributed among the multiple controllers.

Various operations, steps or algorithms as described in connection with the controller 160 can be embodied directly in hardware, in a computer program product 168 such as a software module executed by the processor 162, or in a combination of the two. The computer program product 168 can reside in RAM memory, flash memory, ROM memory, EPROM memory, EEPROM memory, registers, hard disk, a removable disk, or any other form of computer-readable medium 164 known in the art. An exemplary computer-readable medium 164 can be coupled to the processor 162 such that the processor 162 can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The term "controller" or equivalents thereof as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

In other optional embodiments, each of the illumination apparatus 100 may include a serial or auxiliary port (not shown) for direct wired communications, between the illumination apparatus 100 and the external device 184 or the aerial vehicle 10, such as for initial setup or maintenance or for data transfer to the aerial vehicle 10. The serial or auxiliary port may be couplable to a keypad (not shown for initial setup of the device). Alternatively, a wireless device (not shown) may be coupled to the wireless transceiver 180 for initial setup, monitoring, or maintenance.

Referring to FIG. 5, a given illumination apparatus 100A may be configured communicate with a proximate illumination apparatus 100B such that each can transmit and receive data 196 from the other. The data 196 may also be referred to herein as a proximate positional data set 196 or as proximate positional data 196. In certain embodiments, the given illumination apparatus 100A and the proximate illumination apparatus 100B may be wirelessly paired together. A number of these illumination apparatuses 100 may communicated with each other as individual nodes in a node network, such that, for example, the given illumination apparatus 100A can regulate the actual spot size 106 based on the sensed altitude 142 derived from the proximate illumination apparatus 100B. Accordingly, the controller 160 may be configured to generate the command signals 174 for adjusting the angular divergence 124 of light 122 from the light source 120 of the given illumination apparatus 100A based on received data 196 from at least one proximate illumination apparatus 100B. This communication between proximate illumination apparatuses may be beneficial, for example, when the ground surface 20 is not properly reflecting a laser signal, such that the sensed distance 144 cannot be gauged.

In certain optional embodiments, the illumination apparatus 100 may include a temperature sensor (not shown) positioned within the housing 110. The temperature sensor may be configured monitor an external temperature and the controller 160 may be configured to relay that information to the external device 184. In other optional embodiments, the illumination apparatus 100 may include a global positioning sensor (GPS) (not shown) positioned within the housing 110. The GPS sensor may be configured monitor a global position and the controller 160 may be configured to relay that information to the external device 184. In still further optional embodiments, the illumination apparatus 100 may include Hall Effect sensor (or an array of Hall Effect sensors) (not shown) positioned within the housing 110. The Hall Effect sensor (or an array of Hall Effect sensors) may be configured monitor a power usage of at least the light source 120 and the controller 160 may be configured to relay that information to the external device 184.

In certain other optional embodiments (not shown), the coupling between the housing 110 and the aerial vehicle 10 may be an articulating motorized mount that may be enabled to manipulate the position of the housing 110 such that the light 122 from the light source 120 may track a target 104 other than directly beneath the aerial vehicle 10 (e.g., perpendicular to the lower portion 12 of the aerial vehicle 10).

Figure 6:
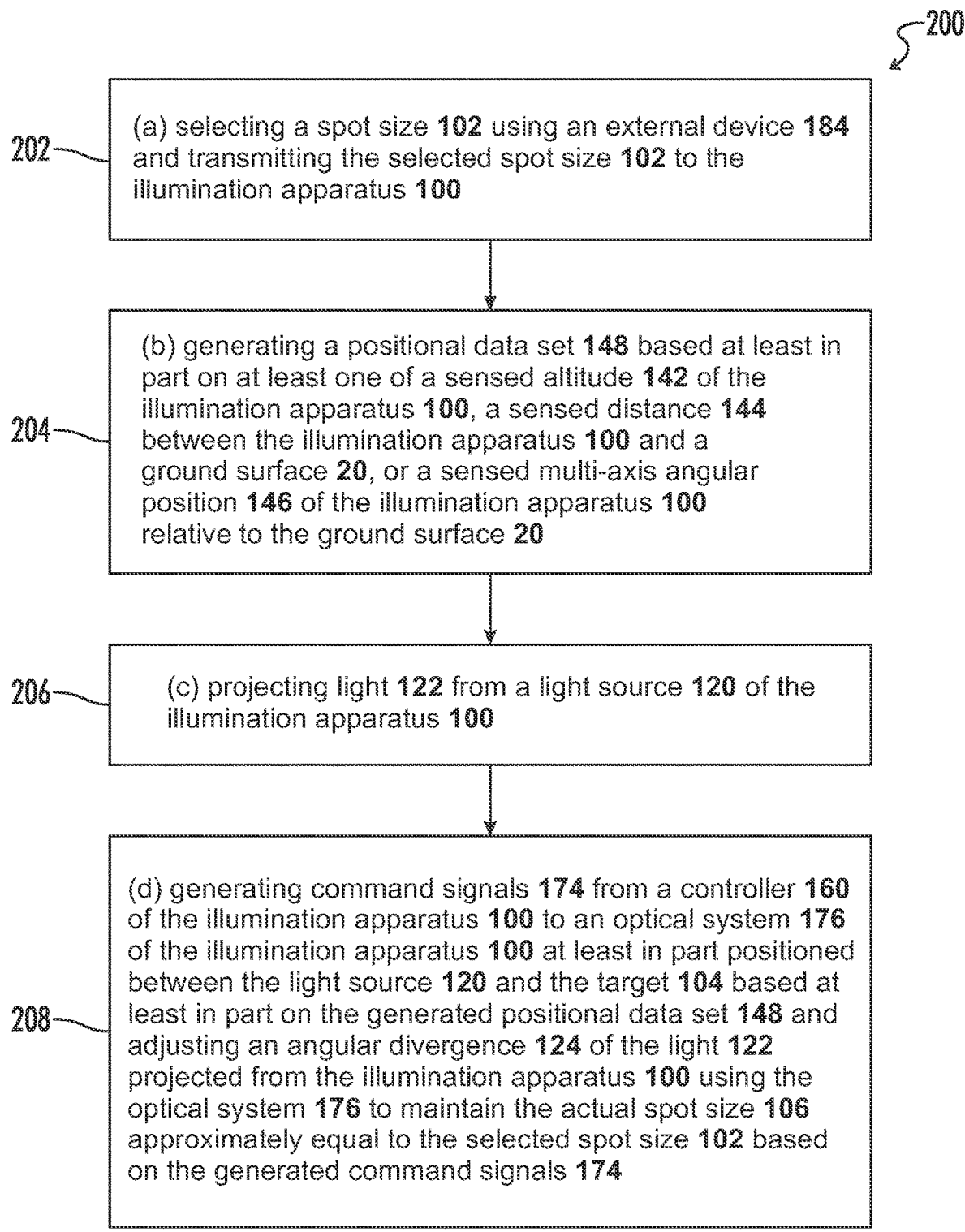
FIG. 6 is a flow chart a method of controlling an actual spot size projected on a target from the illumination apparatus of FIG. 2 coupled to the aerial vehicle of FIG. 1 in accordance with the present disclosure.

Referring to FIG. 6, a method 200 of controlling the actual spot size 106 projected on a target 104 from an illumination apparatus 100 coupled to an aerial vehicle 10 is illustrated. The method 200 may comprise (a) selecting 202 a spot size 102 using an external device 184 and transmitting the selected spot size 102 to the illumination apparatus 100. The method 200 may further comprise (b) generating 204 a positional data set 148 based at least in part on at least one of a sensed altitude 142 of the illumination apparatus 100, a sensed distance 144 between the illumination apparatus 100 and a ground surface 20, or a sensed multi-axis angular position 146 of the illumination apparatus 100 relative to the ground surface 20. The method 200 may further comprise (c) projecting 206 light 122 from a light source 120 of the illumination apparatus 100. The method 200 may further comprise (d) generating 208 command signals 174 from a controller 160 of the illumination apparatus 100 to an optical system 176 of the illumination apparatus 100 at least in part positioned between the light source 120 and the target 104 based at least in part on the generated positional data set 148 and adjusting an angular divergence 124 of the light 122 projected from the illumination apparatus 100 using the optical system 176 to maintain the actual spot size 106 approximately equal to the selected spot size 102 based on the generated command signals 174.

Step (a) of the method 200 may further include receiving the selected spot size 102 using a wireless transceiver 180 coupled to the controller 160.

Step (b) of the method 200 may further include continually updating the generating positional data set 148.

Step (c) of the method 200 may further include receiving a light command from the external device 184 by the controller 160 associated with enabling or disabling the light source 120.

Step (d) of the method 200 may further include adjusting a lens position 134 of at least one optical lens 132 of the optical system 176 using a mechanical drive motor 170 of the optical system 176 based on the generated command signals 174 to provide the adjusted angular divergence 124.

Step (d) of the method 200 may further include receiving proximate positional data 196 from one or more proximate similar illumination apparatuses 100B. In accordance with this embodiment, the generated command signals 174 depend at least in part on the proximate positional data 196.

The method 200 may further include storing, receiving, and transmitting data 148 using the controller 160, wherein the data 148 includes one or more of the sensed altitude 142 of the illumination apparatus 100, the sensed distance 144 between the illumination apparatus 100 and the ground surface 20, or the sensed multi-axis angular position 146 of the illumination apparatus 100 relative to the ground surface 20.

The method 200 may still further include powering at least the controller 160 using a power source 190, such as a battery power supply; and selectively enabling a low power mode and an active mode using the controller 160. The low power mode may be configured to conserve power usage.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

What is claimed is:

1. An illumination apparatus for attachment to an aerial vehicle, the illumination apparatus comprising:
   a housing configured to be coupled to the aerial vehicle;
   a light source coupled to the housing;
   a lens system coupled to the housing and at least partially covering the light source, the lens system configured to adjust an angular divergence of light from the light source;
   at least one position sensor positioned within the housing, the at least one position sensor configured to generate signals corresponding to at least one of an altitude of the illumination apparatus, a distance between the illumination apparatus and a ground surface, or a multi-axis angular position of the illumination apparatus relative to the ground surface; and
   a controller positioned within the housing and functionally linked to each of the at least one position sensor, the light source, and the lens system, the controller configured to adjust the angular divergence of the light from the light source using the lens system based at least in part on monitored data from the at least one position sensor and a selected spot size of the light on a target such that an actual spot size on the target is approximately equal to the selected spot size.

2. The illumination apparatus of claim 1, further comprising:
   a wireless transceiver positioned within the housing and functionally linked to the controller, the wireless transceiver configured to receive position data from at least one proximate aerial vehicle.

3. The illumination apparatus of claim 2, wherein the controller is further configured to:
   determine a condition wherein the position data from one or more of the at least one proximate aerial vehicle should be used in place of the signals from the at least one position sensor; and
   upon determining said condition, to adjust the angular divergence of the light from the light source using the lens system based at least in part on the received position data.

4. The illumination apparatus of claim 1, wherein:
   the at least one position sensor includes one or more of an altitude sensor, a distance sensor, or a multi-axis sensor.

5. The illumination apparatus of claim 4, wherein:
   the altitude sensor is a pressure sensor;
   the distance sensor is a laser rangefinder; and
   the multi-axis sensor is one of a three-axis accelerometer or a gyroscope.

6. The illumination apparatus of claim 1, wherein:
   the lens system comprises at least one optical lens at least partially covering the light source; and
   a distance between the at least one optical lens and the light source at least in part controls the angular divergence of the light from the light source.

7. The illumination apparatus of claim 6, wherein:
   the lens system further includes an optical lens housing; and
   the at least one optical lens is slidably positioned within the optical lens housing.

8. The illumination apparatus of claim 6, wherein the lens system further includes:
   a mechanical drive motor positioned within the housing, the mechanical drive motor configured to control the distance between the at least one optical lens and the light source based at least in part on motor control signals from the controller for adjusting the angular divergence of the light from the light source.

9. The illumination apparatus of claim 1, further comprising:
   a mechanical drive motor coupled between the controller and the lens system, the controller configured to transmit motor control signals to the mechanical drive motor for adjusting the angular divergence of the light from the light source using the lens system.

10. The illumination apparatus of claim 1, wherein:
    the actual spot size projected on the target from the light source depends at least in part on one or more of the altitude of the illumination apparatus, the distance between the illumination apparatus and the ground surface, the multi-axis angular position of the illumination apparatus relative to the ground surface, or the angular divergence of the light from the light source.

11. The illumination apparatus of claim 1, further comprising:
    a wireless transceiver positioned within the housing and coupled to the controller, the wireless transceiver configured to at least receive data from an external device for controlling the selected spot size.

12. A method of controlling an actual spot size projected on a target from an illumination device coupled to an aerial vehicle, the method comprising:
    (a) selecting a spot size using an external device and transmitting the selected spot size to the illumination device;
    (b) generating a positional data set based at least in part on at least one of a sensed altitude of the illumination device, a sensed distance between the illumination device and a ground surface, or a sensed multi-axis angular position of the illumination device relative to the ground surface;
    (c) projecting light from a light source of the illumination device; and
    (d) generating command signals from a controller of the illumination device to an optical system of the illumination device at least in part positioned between the light source and the target based at least in part on the generated positional data set and adjusting an angular divergence of the light projected from the illumination device using the optical system to maintain the actual spot size approximately equal to the selected spot size based on the generated command signals.

13. The method of claim 12, further comprising receiving position data from at least one proximate aerial vehicle.

14. The method of claim 13, further comprising:
    determining a condition wherein the position data from one or more of the at least one proximate aerial vehicle should be used in place of the generated positional data set; and upon determining said condition, to generate the command signals based at least in part on the received position data.

15. The method of claim 12, wherein step (a) further comprises:

receiving the selected spot size command using a wireless transceiver coupled to the controller.

16. The method of claim 12, wherein step (b) further comprises:

continually updating the generating positional data set.

17. The method of claim 12, wherein:

the generated command signals from the controller depend at least in part on one or more of the sensed altitude of the illumination device, the sensed distance between the illumination device and the ground surface, or the sensed multi-axis angular position of the illumination device relative to the ground surface.

18. The method of claim 12, wherein step (d) further comprises:

adjusting a lens position of at least one optical lens of the optical system using a mechanical drive motor of the optical system based on the generated command signals to provide the adjusted angular divergence.

19. The method of claim 12, further comprising:

storing, receiving, and transmitting data using the controller, wherein the data includes one or more of the sensed altitude of the illumination device, the sensed distance between the illumination device and the ground surface, or the sensed multi-axis angular position of the illumination device relative to the ground surface.

20. The method of claim 12, further comprising:

powering at least the controller using a battery power supply; and selectively enabling a low power mode and an active mode using the controller, the low power mode configured to conserve power usage.

* * * * *